(No Model.)

H. GALE.
HORSE HAY RAKE.

No. 299,773. Patented June 3, 1884.

Attest:
N. J. Sprague
E. Scully

Inventor.
Horatio Gale.
By his Att'y
Thos. A. Sprague

UNITED STATES PATENT OFFICE.

HORATIO GALE, OF ALBION, MICHIGAN.

HORSE HAY-RAKE.

SPECIFICATION forming part of Letters Patent No. 299,773, dated June 3, 1884.

Application filed November 3, 1883. (No model.)

*To all whom it may concern:*

Be it known that I, HORATIO GALE, of Albion, in the county of Calhoun and State of Michigan, have invented new and useful Improvements in Horse Hay-Rakes; and I do hereby declare that the following is a full, clear, and exact description thereof, reference being had to the accompanying drawings, which form a part of this specification.

This invention relates to certain new and useful improvements in horse hay-rakes; and it consists in providing a cleaner for the teeth of the rake which will act without any bearing friction upon the rake-teeth and allow either a sickle-shaped or circular tooth to be used, and which will under all circumstances keep the cleaner out of contact with the teeth, while at the same time it follows the motion of such teeth when the rake is being dumped and always retains its relative position to such teeth, and in the peculiar construction and in the combination of the various parts, as more fully hereinafter described.

Figure 1:
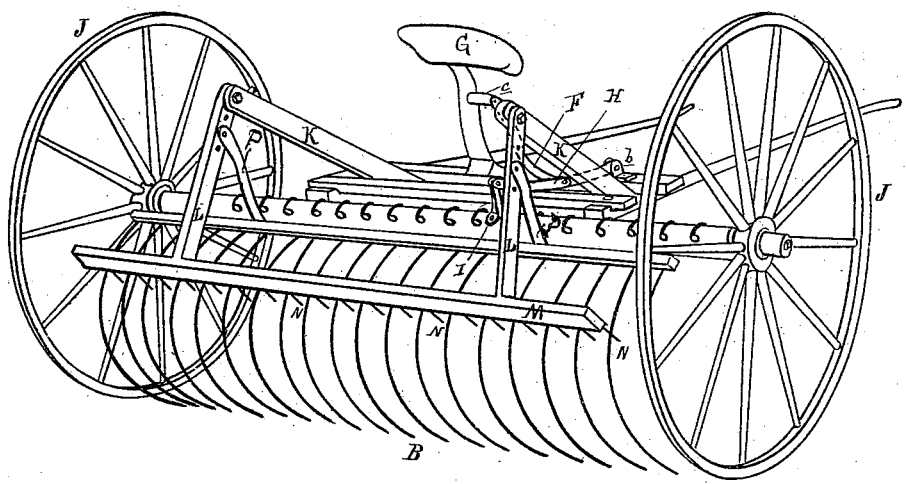
Figure 2:
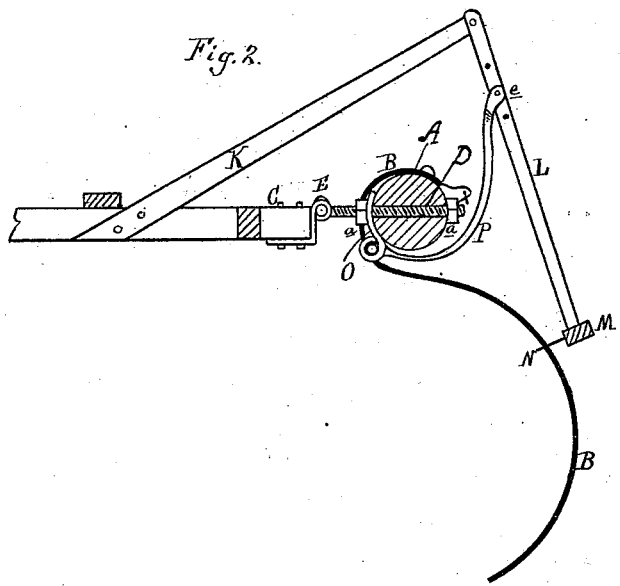

Figure 1 is a perspective view, taken from the rear, of a horse hay-rake; and Fig. 2 is a cross-section of portions of the same.

A represents the rake-head axle, which is preferably a round shaft, to which the spring rake-teeth are secured, so that the upper bend in such teeth passes over the top, around the front, and underneath such rake-head to the rear. This rake-head is secured to the frame C by means of bolts D, passing through the lateral axis of such rake-head, the outer ends of said bolts terminating in an eye engaging with the hooks E upon the main frame. This bolt is threaded, and the nuts a allow the head to be adjusted to or from the frame, as may be desired, it being understood that this method of adjustment is preferable to any one now in use upon implements of this character on account of the fine adjustment obtained by the thread and nuts. One end of a curved lever is pivoted to the frame at b, while its opposite end terminates in a handle, c, within easy reach of the driver's seat G. To this curved lever is pivoted the link H, the opposite end of which is pivoted to a stud, I, which is secured to the rake-head and axle A as nearly central to its length as possible. The rake-head and axle A is supported by the traction-wheels J. The office of this lever and its connections is to partially roll such rake-head to dump the load the teeth may be carrying.

K are arms, the front ends of which are secured to the main frame. These arms project diagonally upward to the rear, as shown, and to their outer ends are pivoted other arms, L, to the lower ends of which are secured the lateral clearer-bar M, which is provided with pins N, arranged to pass between the rake-teeth. To prevent this bar M from coming in contact with the rake-teeth, plates O are rigidly secured to the rake-head, as shown in Fig. 2. To each plate O is pivoted a curved bar, P, which is pivotally secured at e to the arms L; and at this point means may be provided for adjusting the length of the throw of this hinged bar.

Now, in operation, when the teeth are dumped, the rake-head axle is rotated by the dumping device toward the front, and this carries the pivotal points of connection between the plates O and bars P to the rear, forcing to the rear the arms L, which carry the cleaner-bar the same distance that the teeth are forced in the process of dumping, thereby preventing any contact between the teeth and the cleaner, and the consequent friction that would arise should such cleaner rest against the bed of the teeth.

What I claim as my invention is—

1. The combination, in a spring-tooth rake, of the rolling head B, carrying the teeth, the clearer-bar M, the swinging arms L, carrying said bar M, and the bars P, pivoted at their opposite ends to said head B and arms L, substantially as and for the purpose specified.

2. In a spring-tooth rake, in combination with a rolling rake-head, the arms K and L, the bar M, and the bars P, pivotally secured to said head at one end and adjustably pivoted at their other ends to the arms L, the parts being constructed, arranged, and operating substantially as and for the purposes described.

3. In a spring-tooth rake, in combination with a rolling rake-head adjustably pivoted to the thill-frame, the arms L, pivoted at their upper ends to the arms K, and carrying the clearer M N, the bars P, adjustably pivoted to said arms L, and curving around and pivoted to the forward under side of said rake-head, whereby the clearer may be adjusted to correspond with the lateral adjustment of the head and prevented from impinging against the rake-teeth, substantially as set forth.

HORATIO GALE.

Witnesses:
SAM V. IRWIN,
H. M. DEARING.